Patented May 31, 1949

2,471,890

UNITED STATES PATENT OFFICE 2,471,890

POLYMERIZATION OF ISOBUTYLENE IN THE PRESENCE OF CONTROLLED AMOUNTS OF PROMOTERS FOR THE REACTION

Frederick A. Palmer, Wooster, Tex., assignor, by mesne assignments, to Standard Oil Development Company, Elizabeth, N. J., a corporation of Delaware No Drawing. Application June 22, 1946, Serial No. 678,688

6 Claims. (Cl. 260—85.3)

1

The present invention is directed to an improved process for the polymerization of olefins in the presence of a Friedel-Crafts type catalyst. More particularly, the invention is directed to the low temperature polymerization of olefinic mixtures in the presence of Friedel-Crafts type catalyst and a promoter for the reaction.

Prior to the present invention it has been customary to polymerize tertiary olefins, such as isobutylene, and diolefins, such as butadiene or isoprene, at low temperatures of the order of —50° F. to —175° F. to obtain a product which is suitable for vulcanization. The process is extremely sensitive to impurities and it is necessary that expensive expedients be resorted to in order to obtain purified reactants. The nature of the impurities which are removed from the reactants comprises acidic material, unsaturated polymers of relatively low molecular weight, oxygenated bodies and various other extraneous materials which may find their way into the system in which the polymerization is effected. The purification steps comprise various chemical and physical treating methods to obtain the purified product.

It is desirable also to remove water from the olefins since water in appreciable quantities will hydrate the Friedel-Crafts type catalyst and render it less efficient than if the reactants are in an anhydrous condition.

The nature of the impurities has made it difficult to obtain the reactant hydrocarbons in substantially pure condition. From time to time it has, therefore, been necessary in order to obtain best results, to increase the concentration of the Friedel-Crafts type catalyst which is employed. Ordinarily, the catalyst is employed in a solution of an organic halide in a concentration of about 0.1 to 0.5 gram of aluminum chloride per 100 cc. of solvent. The usual solvent employed is an alkyl halide, such as methyl chloride. In order to maintain the efficiency of the catalyst, at times it has been necessary to increase the concentration of aluminum chloride to the upper limit given which may make for unsatisfactory reaction in view of the extremely active nature of these concentrations of catalyst solution.

In accordance with the present invention, the polymerization of olefins in the presence of a Friedel-Crafts type of catalyst at low temperatures is improved by the addition of controlled

2 amounts of hydrogen halide to the reaction mixture. It has been discovered that, contrary to the prior art teachings, hydrogen halide in the reaction mixture in an amount between about 2 and 15 parts per million promotes the reaction and activates the catalyst to a degree that solutions of low catalyst concentration may be employed.

In the preferred practice of the present invention, both the fresh feed of olefinic stock and the catalyst are thoroughly dehydrated. A controlled amount of hydrogen halide is then added either to the stream of fresh feed or to the stream of catalyst or to both streams. The fresh feed and catalyst streams are next separately chilled to the desired low temperature and discharged into a vessel provided with mixing means. The components to the reaction are mixed as rapidly as possible and then allowed to remain in contact for a predetermined period of time. After the reaction has proceeded a sufficient period of time for the formation of the desired polymer, it is terminated by suitable means, such as by adding water to the reaction mixture, and the polymer is then separated as the desired product.

The operation described above is generally applicable to the polymerization of olefins in the presence of a Friedel-Crafts type catalyst. Of particular interest at the present time is the employment of this type of reaction to form vulcanizable gums by the polymerization of isobutylene, a mono-olefin, in the presence of a small amount of diolefin, such as butadiene or isoprene. Suitable Friedel-Crafts type catalysts for promoting this polymerization are aluminum chloride, aluminum bromide and boron trifluoride. A suitable hydrogen halide for addition to the hydrocarbon reactants and catalysts may be either hydrogen chloride, hydrogen bromide, or hydrogen fluoride. The polymerization reaction must be carried out at relatively low temperatures with a preferred range of —100° to —175° F.

Preferred conditions for carrying out the reaction are as follows: The catalyst is prepared by agitating dehydrated methyl chloride with powdered aluminum chloride at a temperature of about —20° F. to give a solution of a concentration of about 0.1 to 0.5 gram of $AlCl_3$ per 100 cc. of methyl chloride. A hydrocarbon feed stock comprising isobutylene having admixed therein from 2 to 20% of isoprene is dehydrated by passing it over a bed of calcium chloride or other suitable dehydrating agent. The hydrogen feed stock containing hydrogen chloride is then chilled to about −140° F. and passed into a vessel. The solution of aluminum chloride in methyl chloride is chilled to a temperature slightly above the freezing point of methyl chloride, say, −120° F., and the catalyst sprayed into the vessel through a nozzle while the diolefin-mono-olefin mixture in the vessel is being violently agitated. From 10 to 20 volume per cent of catalyst solution may be employed which may be added over a period ranging from about ten seconds to ten minutes. After the reactants have been in contact the desired interval the reaction may be terminated by the addition of a large excess of water or alcohol to the vessel. The polymer is then recovered and carefully washed to remove the catalyst after which the polymer may be dried and compounded as is desired. In the quenching step, the catalyst is intentionally destroyed in order to prevent further action beyond the desired polymerization. This quenching step can be effected by any hydrolyzing agent such as alcohol or water, but it is preferred to use hot water.

Although the foregoing is a description of a batch polymerization, it is understood that the process may be made to operate on a continuous basis by constantly adding fresh feed and catalyst to the agitated reaction mixture and constantly removing the product as a slurry along with unconverted feed and methyl chloride.

The invention will be further illustrated by the following examples in which isobutylene and isoprene diluted with methyl chloride were polymerized in a batch reactor.

EXAMPLE 1

Methyl chloride was purified by treatment with phosphoric anhydride. A catalyst solution containing aluminum chloride in an amount of 0.070 gram of aluminum chloride per 100 cc. of solution was employed. To a chilled reactor was introduced a measured amount of a precooled feed comprising isobutylene, isoprene and methyl chloride. The feed contained 25% isobutylene and a small amount of isoprene, amounting to 2.5% of the isobutylene. The feed stock was charged to a cold reactor which had been dried, purged and blanketed with nitrogen. A stirring mechanism was attached and a means was provided for injection of catalyst solution. The feed stock was cooled to −145° F. and injection of catalyst solution was started and maintained at a constant rate of 17 ml./minute. After the desired amount of catalyst had been added, the reactant mass, which was in the form of a slurry, was agitated for an additional two minutes and the reaction stopped by addition of alcohol. The reacted material was then further quenched by the addition of hot water. The rubbery material was kneaded in the presence of hot water until a crumbly body was formed. The crumbs of polymer were strained and squeezed to remove as much entrained water as possible until the water content was in the range of 20%. The weight of the polymer was recorded and corrected for the amount of water remaining in the polymer mass. From the data obtained on the weight of polymer produced, the catalyst efficiency, conversion and the aluminum chloride polymer relationships were calculated.

EXAMPLE 2

The experiments described in Example 1 were repeated with all conditions identical except a contact time of 60 minutes instead of 2 minutes was used.

EXAMPLE 3

The experiments described in Example 1 were repeated with all conditions the same except hydrogen chloride was introduced into the reaction zone in a concentration of 5.5 parts per million.

EXAMPLE 4

The experiments described in Example 2 were repeated with all conditions the same except hydrogen chloride was introduced into the reaction zone in a concentration of 5.5 parts per million.

The data obtained from the runs of Examples 1, 2, 3, and 4 are recorded in Table I:

Table I

| Catalyst Efficiency, Lb. polymer/Lb. AlCl$_3$ | Conversion, Per cent Based on Total Olefins | Aluminum Chloride Added, Gram | Polymer Produced, Grams | Mooney Viscosity |
|---|---|---|---|---|
| STANDARD CATALYST—2 MINUTE CONTACT TIME ||||||
| 1,615 | 16.4 | 0.026 | 42 | -------- |
| 1,920 | 27.8 | 0.037 | 71 | -------- |
| 1,920 | 39.1 | 0.052 | 100 | -------- |
| 1,720 | 49.6 | 0.074 | 127 | -------- |
| 1,570 | 61.4 | 0.100 | 157 | -------- |
| 1,160 | 67.2 | 0.148 | 172 | -------- |
| STANDARD CATALYST—60 MINUTE CONTACT TIME ||||||
| 3,070 | 32.4 | 0.027 | 83 | -------- |
| 4,050 | 60.2 | 0.038 | 154 | -------- |
| 2,940 | 71.7 | 0.062 | 182 | -------- |
| 2,200 | 77.4 | 0.090 | 198 | -------- |
| CATALYST CONTAINING 5.5 P.P.M. HCl—2 MINUTE CONTACT TIME ||||||
| 2,570 | 37.2 | 0.037 | 95 | 66 |
| 3,020 | 60.3 | 0.051 | 154 | 78 |
| 2,750 | 78.6 | 0.073 | 201 | 80 |
| CATALYST CONTAINING 5.5 P.P.M. HCl—60 MINUTE CONTACT TIME ||||||
| 4,080 | 59.0 | 0.037 | 151 | -------- |
| 3,590 | 71.5 | 0.051 | 183 | 81 |
| 3,850 | 81.2 | 0.073 | 208 | 79 |

It will be seen from the data in the foregoing table that in the runs in which hydrogen chloride was present a considerably greater catalyst efficiency was obtained than when hydrogen chloride was absent. Further, it will be noted that the amount of polymer produced is greater in the runs in which hydrogen chloride was present than in the runs when hydrogen chloride was absent.

EXAMPLE 5

In order to illustrate further the critical nature of the concentration of hydrogen chloride promoter in the synthesis of rubbery material by low temperature polymerization of isobutylene and isoprene, additional runs in accordance with the technique described in Example 1 were performed using an amount of hydrogen chloride ranging from 5.5 P.P.M. to 11 P.P.M. at catalysts rates of 17 and 30 ml./minute. These data are given in Table II.

Table II

| Catalyst Efficiency Lb. polymer/Lb. AlCl₃ | Conversion, Per Cent based on Total Olefins | Polymer Produced, Grams | Aluminum Chloride Added, Grams |
|---|---|---|---|
| CATALYST CONTAINING 11 P.P.M. HCl, 30 CC. CAT./MIN. | | | |
| 2,920 | 29.7 | 76 | .026 |
| 2,360 | 20.3 | 52 | .022 |
| 2,820 | 24.2 | 62 | .022 |
| CATALYST CONTAINING 11 P.P.M. HCl, 17 CC. CAT./MIN. | | | |
| 2,350 | 34.0 | 87 | .037 |
| 3,300 | 47.6 | 122 | .037 |
| 2,460 | 25.0 | 64 | .026 |
| CATALYST CONTAINING 5.5 P.P.M. HCl, 30 CC. CAT./MIN. | | | |
| 5,250 | 75.9 | 194 | .037 |
| 2,080 | 30.1 | 77 | .037 |
| REFERENCE CATALYST, 17 CC. CAT./MIN. | | | |
| 1,615 | 16.4 | 42 | .026 |
| 1,920 | 27.8 | 71 | .037 |
| 1,900 | 28.9 | 74 | .039 |
| 1,920 | 39.1 | 100 | .052 |
| 1,720 | 49.6 | 127 | .074 |
| 1,560 | 61.4 | 157 | .100 |
| 1,160 | 67.2 | 172 | .148 |

It may be mentioned that the catalyst formed by the addition of hydrogen chloride was exceedingly active.

EXAMPLE 6

To illustrate further the critical lower limit of the hydrogen chloride concentration, additional runs were made under identical conditions to the above-described runs with the exception that hydrogen chloride was injected in amounts of 3.3, 6.1, and 9.9 parts per million and at an injection rate of the catalyst of 17 ml. per minute. The catalyst was of lower concentration than the catalyst used in the foregoing runs comprising 0.04 gm. of aluminum chloride per 100 cc. of solution with methyl chloride as the solvent. As described previously, the methyl chloride was treated with P₂O₅ for removal of impurities. The results obtained are set out in Table III.

Table III

| Catalyst Efficiency, Lb. Polymer/Lb. AlCl₃ | Conversion, Percent Based on Total Olefins | Aluminum Chloride Added, Gram | Polymer Produced, Grams |
|---|---|---|---|
| CATALYST CONTAINING 9.9 P.P.M. HYDROGEN CHLORIDE | | | |
| 1,190 | 19.5 | .042 | 50 |
| 1,865 | 38.7 | .053 | 99 |
| 1,965 | 44.6 | .058 | 114 |
| 1,970 | 54.0 | .070 | 138 |
| 2,060 | 67.6 | .084 | 173 |
| 1,730 | 71.1 | .105 | 182 |
| 1,415 | 81.3 | .147 | 208 |
| CATALYST CONTAINING 6.1 P.P.M. HYDROGEN CHLORIDE | | | |
| 1,115 | 18.8 | .043 | 48 |
| 1,740 | 36.7 | .054 | 94 |
| 1,780 | 44.6 | .064 | 114 |
| 1,885 | 63.3 | .086 | 162 |
| 1,660 | 70.0 | .108 | 179 |
| 1,345 | 78.9 | .150 | 202 |
| CATALYST CONTAINING 3.3 P.P.M. HYDROGEN CHLORIDE | | | |
| 770 | 12.9 | .043 | 33 |
| 1,560 | 39.1 | .064 | 100 |
| 1,700 | 57.0 | .086 | 146 |
| 1,700 | 71.9 | .108 | 184 |
| CATALYST WITHOUT THE HYDROGEN CHLORIDE ADDITION | | | |
| 750 | 11.7 | .040 | 30 |
| 1,115 | 22.7 | .052 | 58 |
| 1,570 | 43.0 | .070 | 110 |
| 1,580 | 52.4 | .085 | 134 |
| 1,540 | 62.5 | .104 | 160 |
| 1,275 | 74.6 | .150 | 191 |

It will be noted from the foregoing data that without the addition of hydrogen chloride at the low conversions only 30 grams of polymer was produced. With substantially the same conversion and with addition of 3.3 P.P.M. of hydrogen chloride, an increase of about 10% in the amount of polymer was noted. Further increases were noted for the higher conversions. It is also noteworthy that the amount of polymer produced with the low concentration catalyst solution compares favorably with the amount of polymer produced with the higher catalyst concentration solution given in the runs described previously.

EXAMPLE 7

Additional runs were then made in a commercial plant. To a catalyst of known efficiency was added 5 P.P.M. of hydrogen chloride. This amount of hydrogen chloride increased the catalyst efficiency 100% and allowed the production of butyl rubber of a vulcanizable grade.

EXAMPLE 8

Another run was made in a commercial plant that was producing 1900 lbs./hr. of butyl rubber at a conversion of the total olefinic content of about 70%. To this reaction there was added 10 to 15 P.P.M. of hydrogen chloride. As a result, an extremely rapid reaction set in. The conversion of olefins to polymer increased by about 90% and the molecular weight of the butyl rubber was lowered from about 70,000 Staudinger to about 20,000 Staudinger.

It is to be emphasized that unless the amount of hydrogen halide added to the reactant material is controlled below 15 P.P.M. an extremely active uncontrollable reaction sets in which produces a product of inferior characteristics for vulcanization. It is, therefore, contemplated that in the practice of the present inventon an amount of hydrogen halide, specifically hydrogen chloride, in the ranges between 2 and 15 P.P.M. be employed to promote the reaction. It is preferred that an amount of hydrogen halide between 5 and 10 P.P.M. be used.

The nature and objects of the present invention having been thus described and illustrated, what is claimed as new and useful and is desired to be secured by Letters Patent is:

1. A process for producing a polymer which includes the steps of forming a solution of an aluminum halide in an alkyl halide having a concentration in the range between 0.04 and 0.5 gram of aluminum halide per 100 cc. of solution, chilling the solution to a subatmospheric temperature, adding to the chilled solution an amount of a hydrogen halide in the range between 2 and 15 parts per million based on the alkyl halide, and admixing the chilled solution containing hydrogen halide to a moisture free mixture comprising tertiary olefin and alkyl halide chilled to a temperature in the range between —50° and —175° F. in an amount sufficient to polymerize said olefin.

2. A process in accordance with claim 1 in which the aluminum halide is aluminum chloride, the alkyl halide is methyl chloride, and the hydrogen halide is hydrogen chloride.

3. A process in accordance with claim 1 in which the moisture-free mixture comprising tertiary olefin and alkyl halide contains a diolefin having 4 to 5 carbon atoms per molecule in an amount in the range between 2% and 20% based on the tertiary olefin.

4. A method for producing a rubbery polymer which includes the steps of forming a mixture comprising approximately 25% isobutylene, 2% to 20% isoprene based on the isobutylene, and the remainder methyl chloride, chilling the mixture to a temperature of approximately —145° F., dissolving aluminum chloride in methyl chloride to produce a solution having a concentration of aluminum chloride no greater than approximately 0.1 gram per 100 cc. of solution, chilling the solution to approximately —145° F., adding hydrogen chloride to said chilled solution in an amount in the range between 2 and 15 parts per million based on said methyl chloride, and adding said chilled mixture to said chilled solution containing hydrogen chloride to cause polymerization of said olefins.

5. A method for producing a rubbery polymer which includes the steps of forming a mixture containing approximately 25% isobutylene, approximately 2.5% isoprene based on the isobutylene, and the remainder methyl chloride, chilling the mixture to a temperature of approximately —145° F., dissolving aluminum chloride in methyl chloride to produce a solution having a concentration of aluminum chloride in the range between 0.04 and 0.1 gram of aluminum chloride per 100 cc. of solution, chilling the solution to approximately —145° F., adding hydrogen chloride to said chilled solution in an amount in the range between 2 and 15 parts per million based on the methyl chloride, adding said chilled mixture to said chilled solution containing hydrogen chloride to cause polymerization of said isobutylene and isoprene to a polymer having rubbery characteristics, stopping said polymerization reaction after the polymer is formed, and recovering said polymer.

6. A process in accordance with claim 5 in which the reaction is stopped by adding a material which reacts with the aluminum chloride.

FREDERICK A. PALMER.

REFERENCES CITED

The following references are of record in the file of this patent:

UNITED STATES PATENTS

| Number | Name | Date |
|---|---|---|
| 2,344,213 | Otto | Mar. 14, 1944 |

FOREIGN PATENTS

| Number | Country | Date |
|---|---|---|
| 401,297 | Great Britain | Nov. 3, 1933 |